United States Patent [19]

Dietrich et al.

[11] Patent Number: 5,300,369
[45] Date of Patent: Apr. 5, 1994

[54] ELECTRIC ENERGY CELL WITH INTERNAL FAILURE COMPENSATION

[75] Inventors: Fred J. Dietrich, Palo Alto; John C. Hall, Saratoga, both of Calif.

[73] Assignee: Space Systems/Loral, Palo Alto, Calif.

[21] Appl. No.: 918,549

[22] Filed: Jul. 22, 1992

[51] Int. Cl.$^5$ .......................................... H01M 10/34
[52] U.S. Cl. ........................................... 429/7; 429/61
[58] Field of Search ...................... 429/7, 49, 61, 101

[56] References Cited

U.S. PATENT DOCUMENTS

| | | | |
|---|---|---|---|
| 3,867,199 | 2/1975 | Dunlop et al. | 136/28 |
| 4,025,696 | 5/1977 | Tucholski et al. | 429/61 |
| 4,035,552 | 7/1977 | Epstein | 429/58 |
| 4,252,869 | 2/1981 | Heitz et al. | 429/49 |
| 4,895,773 | 1/1990 | Bones et al. | 429/7 |
| 5,171,648 | 12/1992 | Beard | 429/61 |

FOREIGN PATENT DOCUMENTS 1536143 12/1978 United Kingdom .

Primary Examiner—Stephen Kalafut
Attorney, Agent, or Firm—Perman & Green

[57] ABSTRACT

An electrochemical energy cell for use in a satellite or other environment where failure of the cell can cause great harm or inconvenience is disclosed in which the cell operates within a sealed pressure vessel in which a gas is maintained under high pressure and which is subject to bombardment by meteorites which can cause holes or cracks in the pressure vessel, thereby rendering the cell incapable of conducting an electric current therethrough, which in turn renders a battery of such cells useless. To prevent this, a pressure sensitive switch is provided in each cell which is connected in a circuit which by-passes the current generating discs of the cell when the switch is closed. The switch is normally maintained open by the pressure within the vessel, and is biased to close in the event that the pressure in the vessel drops below a predetermined minimum, so that the damaged cell will still conduct current therethrough to maintain the integrity of the entire battery.

5 Claims, 2 Drawing Sheets

ELECTRIC ENERGY CELL WITH INTERNAL FAILURE COMPENSATION

BACKGROUND OF THE INVENTION

The present invention, which is a "subject invention" under INTELSAT Contract No. Intel-683 (INTERSAT VII-A), relates generally to the field of energy cells such as batteries and fuel cells, and more particularly to such energy cells which employ pressure vessel type cells such as those currently used in earth orbiting satellites, and in other applications which employ pressure-vessel type cells.

It is well known that a plurality of electrical cells can be connected in series to obtain an electrical output from a battery consisting of the cells which will have a voltage equal to the sum of the voltages of the individual cells. However, the problem exists in such an arrangement that if one cell in the series is defective or is damaged during use, which results in the cell failing in an open circuit condition, the entire battery is rendered useless because it is impossible to pass an electric current through the battery for either charging or discharging purposes.

It is also well known that communications satellites utilize batteries to provide electric power for a variety of purposes, principally in connection with the operation of electronic communications and instrumentation equipment. Such satellites are typically put into a geosynchronous orbit in which the satellite maintains a fixed location in space relative to a given position on the earth. But regardless of the nature of the orbit, a satellite is virtually isolated from the earth and from contact with man, since it is such an extremely complicated and expensive undertaking to put men and equipment into space to repair a satellite that it is virtually never done. Under these conditions, it is apparent that a battery failure can render the entire satellite useless, which can result in tremendous loss in terms of the cost of the satellite, the expense involved in the launching and the lost communications capability. It would not be unreasonable to assume that a battery failure in a communications satellite could result in a multi-billion dollar loss.

Other applications, such as electric automobiles and generators, and other applications where battery and/or fuel cell failure causes great harm or inconvenience, are candidates for the invention whenever the batteries or fuel cells employ high pressure cells such as nickel-hydrogen, silver-hydrogen, hydrogen-zinc, chloride-bromide, and sealed hydrogen-oxygen.

Thus, from the inception of communications satellites, there has been a continuing effort to improve the reliability of satellite batteries. This effort has met with considerable success, particularly with the development of the electrochemical cell which can operate over a wide range of ambient temperatures, has a relatively high energy density and can be constructed in a variety of configurations, all of which characteristics contribute to rendering this cell ideal for use in outer space. However, some electrochemical cells such as nickel hydrogen cells, by their nature, will only operate in a high pressure environment, typically in the range of 700 to 900 PSI when fully charged, and there must be confined in a pressure vessel which can withstand such internal pressures.

Unfortunately, it is this requirement of such electrochemical cells that renders them vulnerable to a hostile condition of outer space over which man's technological ability has little or no effect, and that is bombardment by meteorites which damage the pressure vessel, causing holes or cracks so that it leaks or completely ruptures. The loss of pressure within the vessel is the only known failure mechanism which results in an open circuit cell and therefore renders it useless since it will not pass electric current therethrough.

Open circuit protection devices currently available consist of one large diode in the "forward" direction to pass the load current, and several diodes in series in the "reverse" direction to allow recharging of the remaining cells to occur. For high current batteries, in the range of 50 to 100 amperes, such as are becoming common for synchronous orbit communications satellites, the "forward" diode dissipates a large amount of power under discharge conditions because of its in inherent 0.6 to 0.7 volt drop. At 100 amperes, the power dissipation is 60 to 70 watts. The thermal design, and accompanying mass, of providing such a circuit for every cell in a battery are very undesirable.

BRIEF SUMMARY OF THE INVENTION

The present invention provides an electric energy cell of the nickel-hydrogen type having an improved open circuit protection device which will operate effectively in the event of loss of cell operating pressure to prevent the cell from destroying the integrity of the entire battery, and does so in a manner which avoids the disadvantages of heretofore known open circuit protection devices.

In its broader aspects, the electric energy cell of the present invention comprises generally a hollow vessel of any convenient configuration which is sealed against ambient atmosphere and is adapted to withstand internal pressures substantially greater than atmospheric pressure. The vessel contains an electrochemical means which is capable of generating an electric current. A first cell terminal is mounted on the vessel and extends through the wall thereof to the outside of the vessel, and is connected to a first terminal of the electrochemical means. A second cell terminal is also mounted on the vessel and extends through the wall thereof to the outside of the vessel, and is connected to a second terminal of the electrochemical means. Finally, a pressure sensitive switch means is mounted within the vessel and is connected to the first and second cell terminals and to one of the terminals of the electrochemical means for alternately permitting electric current to flow between the electrodes through the electrochemical means or between the electrodes directly through the switch means, depending upon the extent of pressure in the vessel. Thus, the pressure sensitive switch means is effective to cause electric current to flow between the electrodes through the electrochemical means when normal operating pressure is maintained in the vessel, and is effective to by-pass the electrochemical means and cause electric current to flow between the cell terminal directly through the switch means when the pressure in the vessel drops below a predetermined level.

In some of its more limited aspects, the pressure sensitive switch is normally biased to a closed circuit condition and is maintained in an open circuit condition by the pressure in the vessel, so that loss of pressure in the vessel causes the switch to close and provide a short circuit between the electrodes which by-passes the electrochemical means.

In one form of the invention, the pressure sensitive switch means comprises a housing mounted within the vessel and containing a diaphragm which divides the chamber into a hermetically sealed portion of relatively low pressure and another portion which is in communication with the internal pressure in the vessel. An electrical contact is mounted on the diaphragm, and a second electrical contact is mounted on the housing in position to contact the first electrical contact if the pressure in the vessel drops below a predetermined level and the pressure in the sealed portion of the housing causes the diaphragm to move.

In other embodiments of the invention, other forms of pressure sensitive switches could be utilized. These include a helical Bourdon tube and a liquid manometer, which can be implemented to work in zero gravity, and any other form of a pressure sensor which can cause electrical contacts to close and conduct current.

The electric energy cell of the present invention has several distinct advantages over current technology. A major advantage is that the barometric switch inside the cell pressure vessel is of very low mass, since it involves only very short internal straps to conduct the electric current, unlike the diode solution, which could involve several feet of very heavy wire for each cell depending on the location required for the diodes for thermal reasons. And the heat sinking of the diodes to accommodate their dissipation is an additional significant mass factor. Obviously, the reduction of mass in any component of a satellite is of major importance in terms of the fuel consumption and power required to put the satellite into orbit.

Another advantage of the barometric switch is that, as mentioned above, in the forward direction the diode drop is about 0.6 to 0.7 volt, so the battery voltage would drop by this amount in addition to the loss of the cell voltage. In contract, the energy cell of this invention would provide a voltage drop of typically 10 to 30 millivolts, reducing the battery voltage drop to essentially the loss of the single failed cell.

Another advantage of the present invention, particularly when considered in connection with its use in otherwise very expensive satellites, is that it has a relatively low cost. The barometric switch is incorporated within the cell housing by the cell manufacturer and avoids the separate design, manufacturing and assembly of a diode protection system for each cell.

Another advantage of the present invention is improved reliability. The semiconductor diodes used to allow both the forward current flow and the reverse charging current flow have finite failure rates and these rates, when multiplied by the total number of semiconductors which must be used (for example, in a 42 volt battery with 27 cells there are 108 diodes) becomes very significant. On the other hand, the infinitesimal failure rate of the barometric pressure switch, (of which only 27 are required in this example), could significantly reduce the predicted failure rate, and therefore the reliability, of the battery.

Another advantage of the present invention is that essentially no heat is generated by the bypass device, in contrast to the typically 70 watts generated by the diodes of the previously discussed open circuit protection device. This absence of heat improves the capacity and energy density of the battery as well as its life, thereby reducing the cost of a battery to satisfy a particular power load.

Having briefly described the general nature and some of the significant advantages of the present invention, it is a principal object thereof to provide an electric energy cell for use in a satellite having unique features of construction which provide advantages not heretofore obtained and obviates or eliminates the disadvantages of current technology.

It is another object of the present invention to provide an electric energy cell for use in a satellite which provides a short circuit by-pass through the cell in the event of failure of the operating pressure within the cell to maintain the operating integrity of the battery which contains the cell.

It is still another object of the present invention to provide an electric energy cell for use in a satellite which has the characteristics of low mass, low voltage drop and low cost which are essential to any electric energy cell intended for satellite use.

These and other objects and advantages of the present invention will become more apparent from an understanding of a presently preferred embodiment of the invention when considered in conjunction with the accompanying drawings.

DETAILED DESCRIPTION OF THE INVENTION

Figure 1:
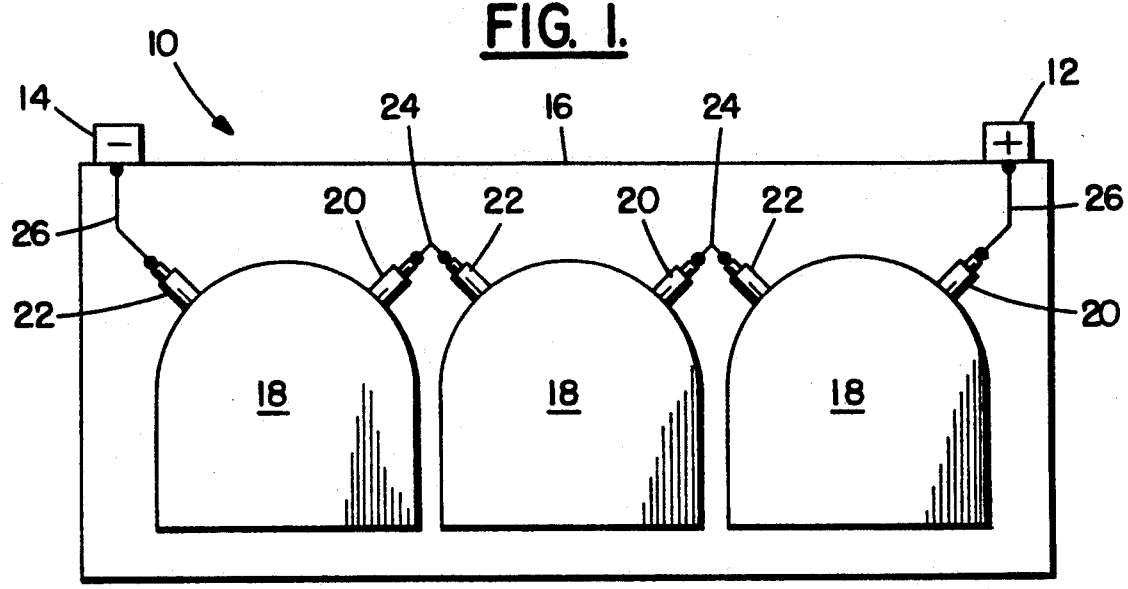
FIG. 1 is a schematic view of a battery which consists of a plurality of electric energy cells constructed in accordance with the present invention.

Referring now to the drawings and particularly to FIG. 1 thereof, the reference numeral 10 designates generally a battery of the type used in satellites and which incorporates the present invention. The battery 10, which in practice may be nothing more than a frame that provides a convenient holder for the energy cells, may be constructed of any suitable, light weight material and have any suitable configuration depending on the nature of the specific satellite in which it is used. For convenience of connection, the battery may be provided with a pair of master terminals 12 and 14 suitably mounted on a housing or other frame part 16 of the battery, one being designated positive and the other being designated negative, to which wires or cables are connected to conduct electric current to any part of the satellite requiring power.

The battery 10 consists of a plurality of electric energy cells 18, of which three are shown, although it will be apparent that any number of cells 18 may be included in the battery depending on the power requirements for the particular application. Each cell 18 has positive and negative cell terminals 20 and 22 respectively mounted thereon in a manner described below the cell terminals 20 being designated positive and the cell terminals 22 being designated negative for reference purposes. Adjacent cells are connected together by suitable wires or straps 24 which connect the positive cell terminals 20 to the negative cell terminals 22 of the cells 18, and additional wires or straps 26 connect the positive cell terminal 20 or the negative cell terminal 22 to the master positive terminal 12 and the negative terminal 14 respectively of the battery 10. In this manner, the cells are connected in series within the battery 10 so that the voltage output of the battery 10 is the sum of the voltages of the individual cells 18. As mentioned briefly above, with this arrangement it is clear that if any cell 18 is defective or is damaged during use in such a manner that it fails in an open circuit condition, the entire battery is useless since no current will flow through an open circuit cell.

Figure 2:
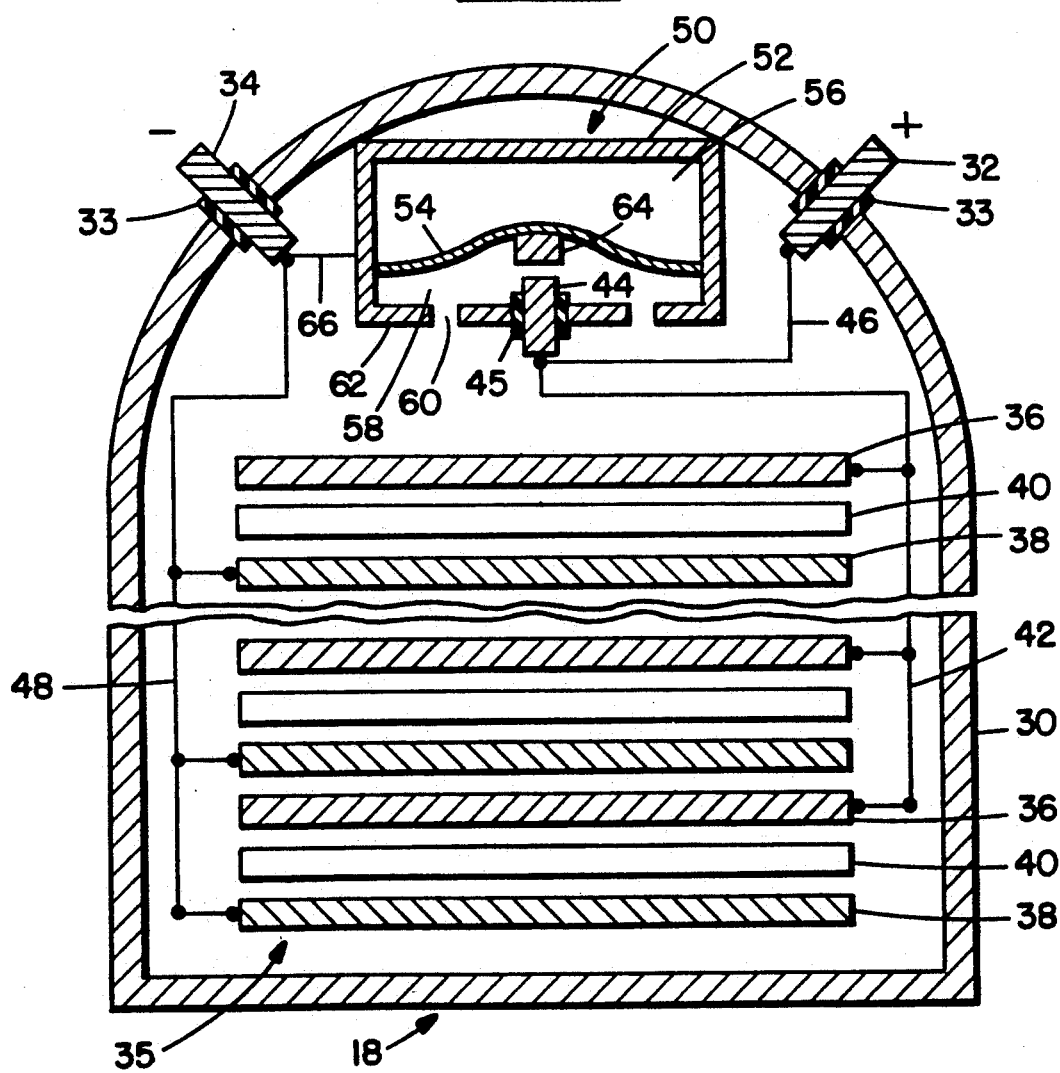
FIG. 2 is a side sectional view through one of the cells shown in FIG. 1.

Referring now to FIG. 2, the reference numeral 18 designates generally one of the cells shown in FIG. 1. The cell 18 comprises a hollow, hermetically sealed pressure vessel 30 having a generally cylindrical configuration with a flat bottom and a domed top, although this specific configuration is not critical, and other configurations may be utilized. The pressure vessel 30 has sufficient strength to safely withstand internal pressures as high as 700–900 PSI, which is the normal fully charged pressure of a nickel-hydrogen cell with which the present invention is used.

The pressure vessel 30 has a pair of cell terminals 32 and 34 (which correspond to the cell terminals 20 and 22 in FIG. 1) suitably mounted on the upper domed portion in a manner so as to be electrically insulated from the pressure vessel 30 such as by the rubber sealing rings 33. For convenience of explanation, the cell terminal 32 is designated positive and the cell terminal 34 is designated negative. An electrochemical current generating means 35 is contained within the vessel 30 and comprises a plurality of cathode discs 36 and a plurality of anode discs 38 which are suitably mounted within the pressure vessel 30, and an insulating separator disc 40 containing a suitable electrolyte is interposed between each adjacent pair of anode and cathode discs. A wire 42 connects all of the cathode discs 36 to a terminal 44 which is mounted on a portion of pressure sensitive switch means yet to be described. Another wire 46 connects the terminal 44 to the positive cell terminal 32 of the cell 18. Another wire 48 connects all of the anode discs 38 to the negative cell terminal 34 of the cell 18. With this arrangement, all of the cathode discs 36 and all of the anode discs 38 are connected to the positive and negative cell terminals 32 and 34 respectively.

The interior of the pressure vessel 30 is filled with two gases. One is an inert gas such as helium or argon which is of sufficient pressure to keep the contacts of the pressure sensor in an open circuit condition when the cell is fully discharged but intact. The second gas is the result of the charging process, which is hydrogen in the case of the nickel-hydrogen cell. This electrolyte gas changes pressure in proportion to the stat of charge of the cell. The total pressure within the cell will never drop below that of the inert gas, and therefore the pressure switch will not operate so long as the integrity of the pressure vessel is maintained and it does not leak Further details of the construction and arrangement of the electric energy cell are not described herein since the energy cell is of the conventional nickel-hydrogen type and forms no part of the present invention.

The energy cell 18 further includes a pressure sensitive switch means indicated generally by the reference numeral 50 which controls the flow of electric current either through the electrochemical means 35 or directly between the cell terminals 32 and 34, thereby by-passing the electrochemical means, depending on the state of pressure of the inert gas in the vessel 30. The pressure sensitive switch means 50 comprises a housing 52 mounted within the domed portion of the vessel 30 in any suitable manner, the housing having any suitable configuration and preferably being formed of an electrically conductive material, although the housing could be formed of a non-conducting material if suitable wire connections are provided. A flexible diaphragm 54, also formed of an electrically conductive material, is mounted within the housing 52 around the periphery thereof so as to divide the housing 52 into an upper compartment 56 and a lower compartment 58. The upper compartment 56 is hermetically sealed and contains a gas at a pressure which is below the minimum operating pressure of the inert gas in the cell 18. The lower compartment 58 is in communication with the gas in the vessel 30 through openings 60 provided in a bottom wall 62 of the housing 52, thereby normally maintaining the diaphragm 54 in a flexed condition.

The diaphragm 54 has an electrical contact 64 suitably mounted thereon so as to move with the diaphragm. In addition, the terminal 44 mentioned above is mounted on the bottom wall 62 so as to be electrically insulated therefrom as by the rubber insulating ring 45, but in a position to underlie the contact 64 mounted on the diaphragm.

From the foregoing description the operation of the cell 18 should be apparent. In the normal operating condition of the cell 18, the pressure in the vessel 30 in sufficient to flex the diaphragm upwardly against the lower pressure in the upper compartment 56 of the housing 52 to maintain the contact 64 out of contact with the terminal 44, thereby maintaining the housing 52 electrically isolated from the electrochemical means 35. In this condition, electric current generated by the electrochemical means will flow through a circuit consisting of the cathode discs 36, wire 42, terminal 44, wire 46, cell terminal 32, through the device being powered or through adjacent cells 18, and back to the electrode 34, wire 48 and the anode discs 38. This mode of operation will continue so long as there is sufficient pressure within the vessel 30 to maintain the diaphragm 54 in the position shown in FIG. 2.

In the event of any damage to the vessel 30 which causes a hole or crack in the wall of the vessel 30, thereby allowing all the internal gas to escape, when the pressure drops below the threshold of the pressure in the upper compartment 56, the diaphragm 54 will move downwardly to bring the contact 64 into contact with the terminal 44. When this happens, a short circuit is established through the cell terminal 32, wire 46, terminal 44, contact 56, diaphragm 54, housing 52 and wire 66 to the negative cell terminal 34, which provides a current path through the cell 18 even though no current will pass through the electrochemical means 35. Thus, the battery as a whole can continue to function in both charge and discharge modes even though one or more cells of the battery have failed in an open circuit condition.

Figure 3:
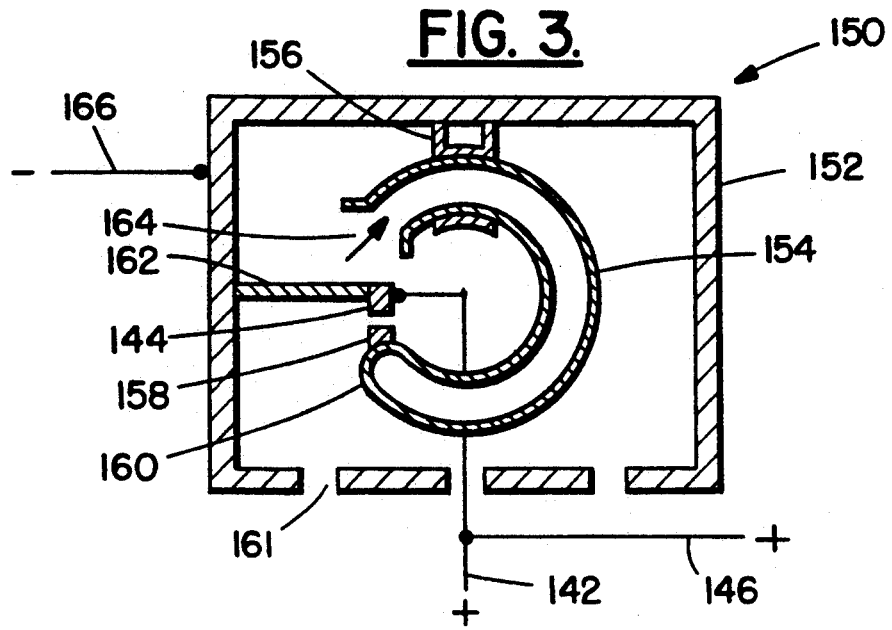
FIG. 3. is a view similar to FIG. 2 showing an alternate embodiment of the pressure sensitive switch means.

FIG. 3 illustrates an alternate form of the invention in which the pressure sensitive switch means 50 of the previous embodiment is replaced by the pressure sensitive switch means 150. In this embodiment, a housing 152 encloses and supports a Bourdon pressure sensor 154 by means of any suitable form of bracket as indicated by the numeral 156. The Bourdon tube is fabricated from an electrically conductive material, and includes a contact 158 near the closed end 160 of the tube. Alternatively, the tube may be fabricated from a non-conducting material with a wire connected between the housing and the contact 158. A positive terminal 144, which corresponds to the terminal 44 in the previous embodiment, is suitably supported within the housing 152 as by the insulated bracket 162, and is connected to the positive terminal 32 of the cell by a wire 146 which corresponds to the wire 46 in the previous embodiment. A wire 142 generally corresponds to the wire 42 of the previous embodiment.

During normal operation of the energy cell 18, the pressure within the cell housing 30, which communicates with the inlet end 164 of the tube through the openings 161 in the housing 152, is sufficient to stress and deform the tube 150 in an "uncoiling" direction to maintain the terminal 144 and the contact 158 separated, with the result that the cell functions in the normal manner in series with other cells in the battery to maintain a normal closed circuit through the cell. However, in the event of any damage to the pressure vessel 30 which results in loss of all internal gas pressure, the tube will tend to reform to its normal configuration and by moving in a "coiling" direction, which will bring the contact 158 on the end of the tube into contact with the terminal 144, thereby closing a short-circuit through the cell terminal 32 on the pressure vessel 30, wire 146, terminal 144, contact 158, tube 154, bracket 156, housing 152 and wire 166 to the negative cell terminal 34, thereby providing the same current path through the cell as described above in connection with the previous embodiment.

Figure 4:
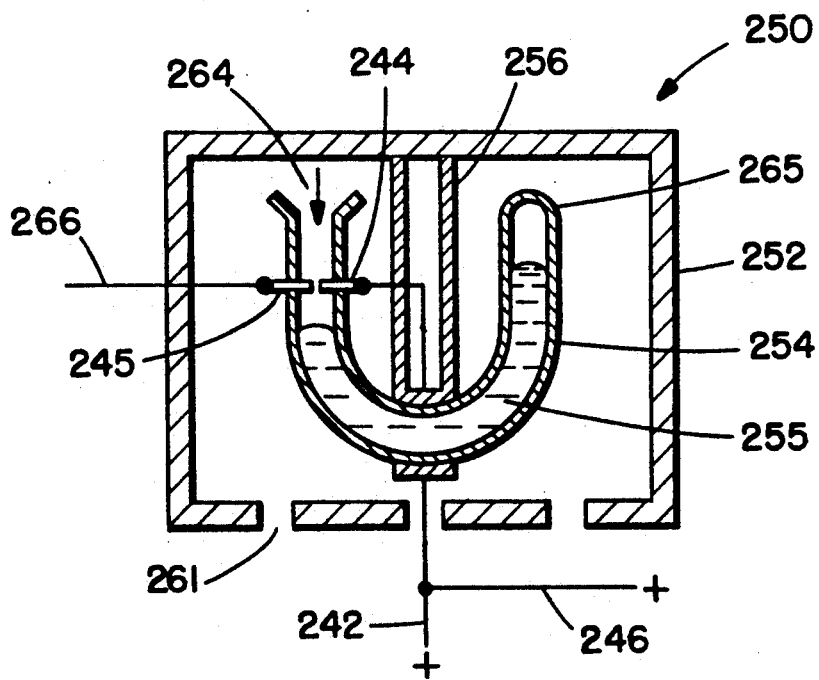
FIG. 4. is a view similar to FIG. 3 showing a further alternate embodiment of the pressure sensitive switch means.

A further embodiment of the invention is illustrated in FIG. 4 in which the pressure sensitive switch means 250 is in the form of a manometer 254 which is mounted within the housing 252 by any suitable bracket means as indicated by the numeral 256. The tube 254 is generally of U-shaped configuration and is fabricated from an electrically insulating material, and is partially filed with mercury 255. A positive terminal 244 and a negative terminal 245 are mounted on opposite sides of the tube 254 adjacent the open end 264 such that they are out of contact with each other. Components 242, 246, 264, and 266 generally correspond to the components 142, 146, 164, and 166 of the FIG. 3 embodiment described above.

As with the previous embodiments, during normal operation of the cell 18, the pressure in the vessel 30, which communicates with the open end 264 of the manometer 254, maintains the mercury sufficiently displaced in the tube so that it is out of contact with the terminals 244 and 245, thereby maintaining a normal operating circuit through the cell in the same manner as with the previous embodiments. However, again, in the event of damage to the vessel 30 which results in loss of all gas pressure, the mercury shifts in the tube 254 due to the trapped pressure in the closed end 265 to cause the mercury to bridge the gap between the terminals 244 and 245, which will establish the same "short-circuit" through the cell as described above in connection with the previous embodiments.

It will be apparent that in both of the embodiments illustrated in FIGS. 3 and 4, the housings 152 and 252 provide a measure of convenience in assembling the components of the pressure sensitive switch means in the pressure vessel 30, but they are not essential since the Bourdon tube 154 and the manometer tube 254 could be mounted directly on the inner wall of the pressure vessel 30

We claim:

1. An electric energy cell for use in a satellite comprising
   A. a hollow vessel sealed against ambient atmosphere and having an internal pressure substantially greater than atmospheric pressure,
   B. electrochemical means contained within said vessel, said electrochemical means being capable of generating an electric current,
   C. a first cell terminal mounted on said vessel and extending through the wall thereof to the outside of said vessel, said first cell terminal being connected to a first terminal of said electrochemical means,
   D. a second cell terminal mounted on said vessel and extending through the wall thereof to the outside of said vessel, said second cell terminal being connected to a second terminal of said electrochemical means, and
   E. pressure sensitive switch means mounted within said vessel and connected to said first and second cell terminals and to one of said terminals for alternately permitting current flow between said cell terminals through said electrochemical means or between said cell terminals directly through said switch means depending on the extent of pressure in said vessel, depending on the extent of pressure in said vessel, whereby said pressure sensitive switch means is effective to cause electric current to flow between said cell terminals through said electrochemical means when normal operating pressure is maintained in said vessel, and is effective to by pass said electrochemical means and cause electric current to flow between said cell terminals directly through said switch means when the pressure in said vessel drops below said normal operating pressure.

2. An electric energy cell as set forth in claim 1 wherein said pressure sensitive switch means is normally biased to a closed circuit condition and is maintained in an open circuit condition by said internal pressure within said vessel, whereby loss of said internal pressure from within said vessel causes said switch to assume a closed circuit condition.

3. An electric energy cell as set forth in claim 2 wherein said pressure sensitive switch means comprises
   A. a housing mounted within said vessel,
   B. a flexible diaphragm mounted within said housing and dividing said housing into a hermetically sealed portion of relatively low pressure and another portion which is in communication with said internal pressure within said vessel, said internal pressure normally maintaining said diaphragm in a flexed position,
   C. a first electrical contact mounted on said diaphragm on the side thereof in contact with said internal pressure and connected to one of said cell terminals, and
   D. a second electrical contact disposed in said vessel and connected to the other of said cell terminals, said second electrical contact being in a first position so as normally to be spaced from said first electrical contact when said diaphragm is in said flexed position, but to be in contact with said first electrical contact when said diaphragm moves to its normal position, whereby said electrical contact means mounted on said diaphragm and said housing establish an electrical short circuit by-pass around said electrochemical means when said internal pressure drops below said normal operating pressure.

4. An electric energy cell as set forth in claim 3 wherein said pressure sensitive switch means comprises:
   A. a pressure responsive deformable tube disposed in said vessel, said tube having a closed end and an open end in communication with the pressure in said vessel so as to normally maintain said tube in a deformed condition,
   B. a first electrical contact mounted on said closed end of said tube and connected to one of said cell terminals, and
   C. a second electrical contact disposed in said vessel and connected to the other of said cell terminals, said second electrical contact being in a first position so as normally to be spaced from said first electrical contact when said tube is in said deformed position, but to be in contact with said first electrical contact when said tube moves to its normal configuration,
   whereby said electrical contacts establish an electrical short circuit by-pass around said electrochemical means when said internal pressure drops below said normal operating pressure.

5. An electrical energy cell as set forth in claim 2 wherein said pressure sensitive switch means comprises:
   A. generally a U-shaped tube in said vessel, said tube having a closed end and an open end in communication with the pressure in said vessel, said tube being partially filled with a column of mercury which is normally maintained in a displaced configuration in said tube in response to the internal pressure from said vessel being communication with said mercury, and
   B. a pair of electrical contacts mounted on opposite sides of said tube adjacent said open end thereof, said contacts being spaced from the end of said column of mercury adjacent said open end of said tube so as to be out of contact with said mercury when said column of mercury is in said displaced configuration but bridged by said column of mercury when said column of mercury assumes its normal configuration,
   whereby said electrical contacts establish an electric electrical short circuit by-pass around said electrochemical means when said internal pressure drops below said normal operating pressure.

* * * * *